June 26, 1962  J. H. RUBENSTEIN  3,040,577
METERING APPARATUS
Filed Sept. 10, 1958  2 Sheets-Sheet 1
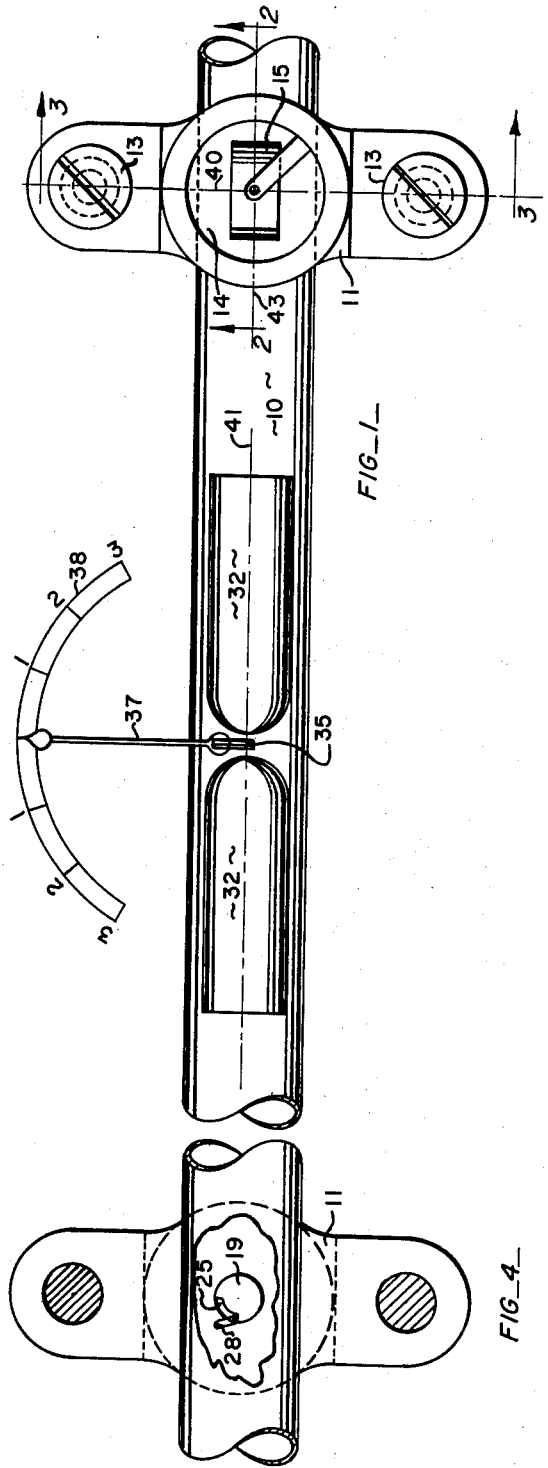
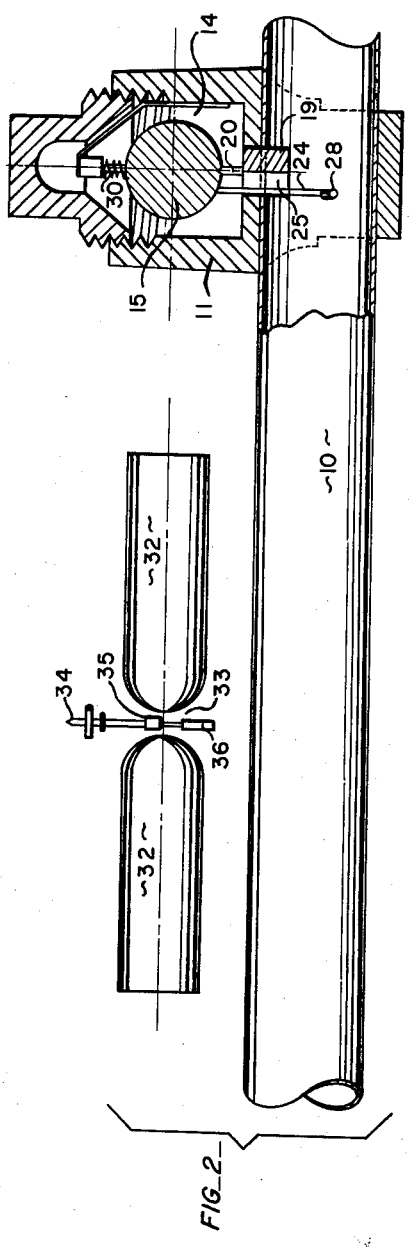
INVENTOR.
Jacob H. Rubenstein
BY
D. Emmett Thompson
ATTORNEY June 26, 1962 J. H. RUBENSTEIN 3,040,577
METERING APPARATUS
Filed Sept. 10, 1958 2 Sheets-Sheet 2
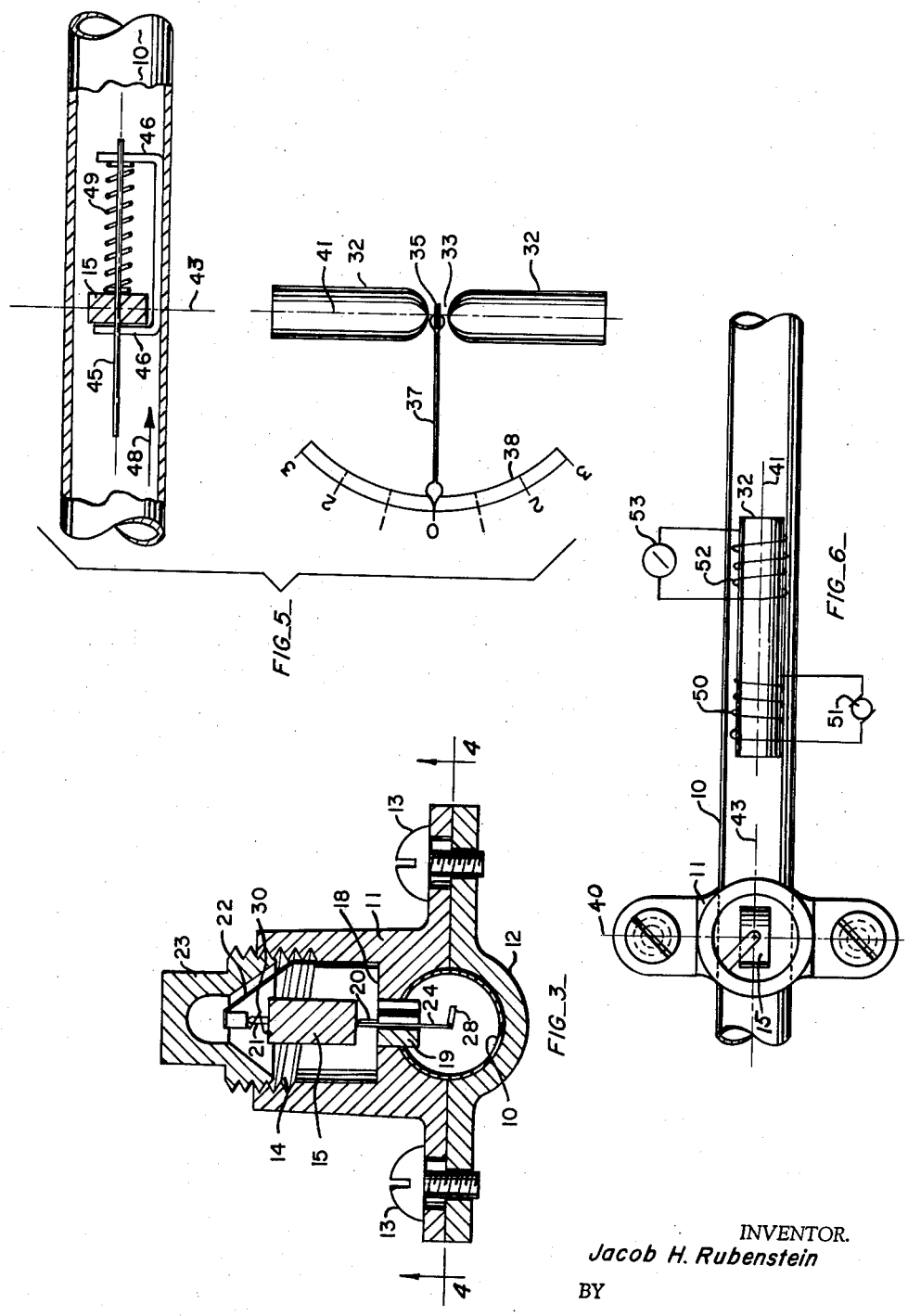
INVENTOR.
Jacob H. Rubenstein
BY
D. Emmett Thompson
ATTORNEY

United States Patent Office 3,040,577
Patented June 26, 1962

3,040,577
METERING APPARATUS
Jacob H. Rubenstein, 101 Shirley Road, Syracuse, N.Y.
Filed Sept. 10, 1958, Ser. No. 760,234
4 Claims. (Cl. 73—228)

This invention relates to metering apparatus for indicating rate of flow, temperature, pressure, etc., of a medium, such as a liquid or a gas, confined within an enclosure.

The apparatus of my invention consists generally of a sensing element mounted in a hermetically sealed enclosure in which the medium is confined, the sensing element being in the form of a permanent magnet movable in response to a deflection or change in the condition of the medium, and in proportion thereto. The apparatus further includes an indicating means in the form of a magnetometer mounted exteriorly of the enclosure for indicating the extent of the movement, or shifting, of the permanent magnet sensing element.

The apparatus is particularly adapted for use as a flow meter for indicating the rate of flow of a liquid, or gas, through a conduit. It is frequently necessary that flow meter instruments be hermetically sealed, especially in the case of high pressure, or in a low pressure system where any atmospheric contamination is undesirable. With such sealed flow meter construction, it is necessary to observe a reading through a transparent window opening in the apparatus. This limits the construction of such apparatus to the employment of materials that are often impractical to use with the particular medium, or the transparent window arrangement cannot be used because the medium itself is not transparent, or is of a nature that clouds over the window.

The invention has as an object to provide a sensing element in the form of a magnet mounted in a hermetically sealed enclosure containing the medium, the sensing element being operable to actuate a calibrated magnetometer mounted exteriorly of the enclosure to indicate a change such as temperature, pressure or rate of flow in the liquid or gas medium.

Another object is to obtain a large excursion, or traveling, of the indicating needle on the calibrated magnetometer by a small angular or linear deflection of the sensing magnet.

The invention has as a further object an indicating apparatus of the type referred to, embodying an arrangement whereby any predetermined angular or linear deflection of the magnet will produce a full scale reading of the magnetometer. The invention further embodying an arrangement whereby a relatively strong static magnet field may be initially brought physically close to a sensitive magnetometer without causing the magnetometer needle to move from zero position.

A further object of the invention is an indicating apparatus that is easily installed on existing conduits containing the medium, and a mounting structure for the sensing element in the enclosure containing the medium offering a minimum amount of resistance to the flow of the liquid, or gas, in the enclosure.

With my invention, a magnet is mounted in an enclosure connected to a conduit or pipe containing the medium to be checked or metered. The magnet is mounted in such a manner that the medium flowing through the enclosure will cause a linear or angular movement of the magnet with its accompanying magnetic field. This movement is proportional to the movement or change taking place in the medium, such as the rate of flow of the medium through the pipe. The polarity and intensity of this displaced, or moved, magnetic field is determined and indicated by a magnetometer mounted exteriorly of the enclosure. A form of magnetometer suitable for this purpose is disclosed in my Patent No. 2,493,779.

The invention consists in the novel features and in the combinations and constructions hereinafter set forth and claimed.

In describing this invention, reference is had to the accompanying drawings in which like characters designate corresponding parts in all the views.

In the drawings—

FIGURE 1 is a plan view of the enclosure for the sensing element, with the top closure thereof removed and showing diagrammatically a form of indicating instrument.

FIGURE 2 is a view, similar to FIGURE 1, but with the enclosure shown in section taken on line 2—2, FIGURE 1.

FIGURE 3 is a transverse sectional view of the enclosure taken on line 3—3, FIGURE 1.

FIGURE 4 is a view taken on line 4—4, FIGURE 3.

FIGURE 5 is a view, similar to FIGURE 2, showing a modified arrangement of the sensing element.

FIGURE 6 is a view, similar to FIGURE 1, but showing another type of indicating instrument.

In the drawings, the apparatus is illustrated as a flow meter in which 10 designates a pipe or conduit through which there is conducted a liquid or gas medium. 11 indicates an enclosure of the so-called saddle type formed with a concavity to receive the pipe 10 and being fixedly clamped thereto by a strap 12 and screws 13. The body portion of the enclosure is substantially circular and is provided with a bore 14 in which the magnet 15 is mounted. The bottom wall 18 of the bore 14 is apertured to receive a plug 19 which also extends through an aperture formed in the pipe 10. This plug carries a pivot 20 on which the magnet 15 is mounted. The magnet is provided with a pin 21 engaging a support 22. The pivots 20, 21 are arranged in axial alignment, and the magnet is movable about the axis of the pivots. A closure in the form of a cap 23 is threaded into the top of the bore 14 to provide for hermetically sealing the enclosure.

In this flow meter arrangement the magnet is provided with a depending member 24 extending downwardly from the magnet through a cut-out portion 25 in the plug 19, and the lower end of the member 24 is provided with a vane 28 positioned to be acted upon by the flow of the medium in the pipe 10. The magnet is normally positioned, as shown in FIGURES 1, 2 and 3, by a torsion spring 30.

An important feature of my invention is that the sensing element, consisting of the magnet 15, may be mounted in the enclosure 11 which, in turn, may be mounted on a conduit or pipe of relatively small diameter, such as one-half inch copper tubing. With the sensing element mounted on pipes of such small dimension, the size of the magnet 15 and the area, or extent, of deflection of the magnet is necessarily limited. However, the indicating needle on the magnetometer must read from zero to maximum in all instances. This full swing of the magnetometer needle is obtained, under these circumstances, by my arrangement which will be described more fully hereinafter.

In FIGURES 1 and 2, the magnetometer is shown diagrammatically. Essentially, it includes antenna core members 32 arranged in spaced coaxial relation to provide a gap 33 in which there is mounted for movement about a pivot axis 34, an iron vane 35 polarized by a permanent magnet 36. A pointer 37 is connected to the vane for movement over a graduated scale 38. A magnetometer of this type is disclosed in my Patent 2,493,779.

A magnetometer is an instrument used to measure the intensity of an external polarized magnetic field. The term "polarized magnetic field" refers to the polarity or direction of the field as imposed on the magnetometer which, in turn, determines the direction of the motion of the indicating needle 37. The magnetometer instrument can be readily mounted on or affixed to the enclosure 11, if desired.

The relative arrangement between the magnet and the core of the magnetometer is initially such that the magnet presents zero polarity to the instrument vane positioned in the air gap of the magnetometer. This may be effected by locating the magnetometer in different positions about the magnet 15 and the pointer 37 is conveniently zeroed in by selecting a position that results in the magnet presenting zero polarity to the vane of the magnetometer. Thereafter, the pointer of the magnetometer will indicate proportionately the degree of movement of the magnet 15.

In the arrangement shown in FIGURES 1–4, the magnet 15 is of cylindrical formation, the poles of the magnet being on the opposite side faces thereof. Upon installation, the magnet 15 and the core members 32 of the magnetometer are so arranged that the magnetic axis of one is disposed perpendicular to the magnetic axis of the other. In this instance, the magnetic axis of the magnet is defined as a line connecting the two magnetic poles of the magnet, as indicated by the line 40, FIGURE 1, the line 41 indicating the magnetic axis of the core members 32 of the magnetometer. The line 43, FIGURE 1, indicates the neutral polarity plane of magnet 15—that is, the plane perpendicular to the magnetic axis and equidistant at all points from the magnetic poles of the magnet.

As shown in FIGURE 1, this neutral polarity plane of the magnet 15 coincides with the magnetic axis 41 of the magnetometer. With the sensing magnet 15 thus arranged, relative to the cores 32 of the magnetometer, there is no indication of a magnetic presence by the magnetometer, and the magnetometer will read zero. Any linear or angular movement of the magnet 15, so as to move the neutral polarity plane 43 out of registration with the magnetic axis 41 of the magnetometer, will cause the magnetometer to indicate an external magnetic presence. The polarity of the magnetic presence is determined by the polarity of the pole face of the magnet exposed to the magnetometer.

For example, if the liquid or gas medium flowing through the pipe 10 against the vane 28 effects rotative movement of the magnet 15 on its pivots 20, 21, the neutral polarity plane 43 will shift out of registration with the magnet axis 41 of the magnetometer, and the influence of the magnetic field from one of the poles of the magnet 15, depending on the direction of rotation, will cause a concentration of polarized magnetic flux at the gap 33, thereby causing the polarized vane 35 to move about its pivots 34. The strength of this field induced in the core structure 32 depends on the extent of movement of the magnet which in turn will determine the extent of the movement of the vane 35 and the pointer 37 carried thereby.

In other words, the sensitivity, or the degree of movement of the needle 37 over the scale 38 is proportional to the intensity of the external magnetic field emanating from the magnet 15. This intensity increasing as the magnetic axis 40 of the magnet approaches alignment with the magnetic axis 41 of the magnetometer. The sensitivity of the magnetometer is varied by moving it toward or from the enclosure 11, and the magnet 15 therein.

In the arrangement shown in FIGURE 5, the magnet 15 is mounted upon an elongated pin 45 slidably mounted in supports 46 secured to the interior of the pipe 10. In this arrangement, pressure of the gas or liquid in the direction of the arrow 48 effects linear movement of the magnet 15 against the action of spring 49 to move the neutral polarity plane 43 of the magnet out of registration with the magnetic axis 41 of the magnetometer.

A somewhat different form of magnetometer is illustrated in FIGURE 6. A primary winding 50 is positioned upon the core member 32 and connected to an audio generator indicated at 51. A secondary coil 52 is also positioned on the core and connected to a meter 53. The neutral polarity plane 43 of the magnet 15 is coincident with the axis 41 of the core 32. A signal appears in the secondary coil 52, for actuation of the meter 53, by virtue of the coupling of the primary and secondary coils 50, 52, through the iron core 32. Normally only a very small amount of flux is emanated into the core of the transformer because the axis of the transformer core is in the neutral polarity plane of the magnet 15. However, when the magnet is rotated, the magnet begins to saturate the core of the transformer, thereby decoupling the primary from the secondary and the voltage, as read on the meter 53, diminishes. The meter is graduated to indicate the decrease in voltage proportional to the flux induced in the core by the shifting of the magnet and, as previously explained, the shifting of the magnet is proportional to the extent of the movement of the medium. Obviously, the same result would be obtained by movement of the magnet 15 in a linear direction, as described in connection with FIGURE 5.

This arrangement is particularly advantageous in instances where it is desired to have the indicating meter 53 located at a point remote from the sensing magnet 15.

It will be apparent the magnet 15 may be moved or shifted by a change of pressure or temperature by the use of suitable activity mechanism.

It will be further apparent the apparatus described embodies a construction economical to manufacture and which is free from maintenance after installation.

What I claim is:

1. A metering apparatus for indicating the condition of a medium confined within an enclosure, comprising a permanent magnet mounted in the enclosure, a magnetometer mounted externally of the enclosure in proximity thereto, said magnetometer including a pair of flux gathering antenna members disposed in spaced coaxial relation, said antenna members having a magnetic axis extending in a direction lengthwise of said members, means mounted in said magnetic axis and responsive to indicate the intensity of the magnetic field in said axis, said magnet being movable proportional to a change in the condition of said medium to move the magnetic axis of said magnet toward the position coincident with the magnetic axis of said magnetometer.

2. Metering apparatus for indicating the condition of a medium comprising a permanent magnet, a magnetometer mounted in proximity to said magnet, said magnetometer including a pair of flux gathering antenna core members disposed in spaced coaxial relation, said antenna core members having a magnetic axis extending in a direction lengthwise of said members, means mounted in said magnetic axis and responsive to indicate the intensity of the field in said core members, said magnet being normally positioned to present zero polarity to said magnetic axis of said magnetometer, said magnet being movable proportionately to a change in the condition of the medium to present a polarized magnetic field to said core members, the intensity of said polarized field in said core members being proportional to the movement of said magnet.

3. Metering apparatus for indicating changes in the condition of a medium confined within an enclosure comprising a permanent magnet, a magnetometer mounted in juxtaposition to said permanent magnet, said magnetometer including a pair of flux gathering antenna core members spaced in coaxial relation, said antenna members having a magnetic axis extending lengthwise in said members, means mounted in said magnetic axis and responsive to indicate the intensity of the field in said core members, said permanent magnet being normally positioned with its magnetic axis extending in predetermined relation to the magnetic axis of said antenna members, said permanent magnet being movable to shift its magnetic axis to change the intensity of the field presented to the antenna members of said magnetometer, the intensity of said field presented to said antenna members being in proportion to the extent of the movement of said magnet from normal position, and means positioned within said enclosure and operatively connected to said permanent magnet for moving the same in proportion to the change in said medium.

4. A meter for measuring the condition of a mass comprising a magnetic means, a magnetometer mounted in juxtaposition to said magnetic means and including a pair of flux gathering antenna core members disposed in spaced coaxial relation, said antenna members having a magnetic axis extending in lengthwise direction of said members, means mounted in said magnetic axis and responsive to indicate the intensity of the field in said magnetic axis, the magnetic axis of said magnetic means normally extending in predetermined relationship to the magnetic axis of said antenna members, said magnetic means being movable by a change in the condition of said mass to shift its magnetic axis in proportion to the magnitude of such change.

References Cited in the file of this patent

UNITED STATES PATENTS

| | | |
|---|---|---|
| 1,935,445 | Heinz | Nov. 14, 1933 |
| 2,383,758 | Ziebolz | Aug. 28, 1945 |
| 2,483,266 | De Giers | Sept. 27, 1949 |
| 2,493,779 | Rubenstein | Jan. 10, 1950 |
| 2,621,513 | Zschokke et al. | Dec. 19, 1952 |

FOREIGN PATENTS

| | | |
|---|---|---|
| 662,353 | Great Britain | Dec. 5, 1951 |